US009509840B2

(12) United States Patent
Zhang et al.

(10) Patent No.: US 9,509,840 B2
(45) Date of Patent: Nov. 29, 2016

(54) METHOD AND SYSTEM FOR MARKING A PHONE NUMBER

(71) Applicant: Shanghai Chule (CooTek) Information Technology Co. Ltd., Shanghai (CN)

(72) Inventors: Kan Zhang, Shanghai (CN); Meng Zhang, Shanghai (CN); Teng Ren, Shanghai (CN); Jian Wang, Shanghai (CN)

(73) Assignee: SHANGHAI CHULE (COOTEK) INFORMATION TECHNOLOGY CO. LTD., Shanghai (CN)

( * ) Notice: Subject to any disclaimer, the term of this patent is extended or adjusted under 35 U.S.C. 154(b) by 0 days.

(21) Appl. No.: 14/598,192

(22) Filed: Jan. 15, 2015

(65) Prior Publication Data

US 2016/0006868 A1 Jan. 7, 2016

(30) Foreign Application Priority Data

Nov. 15, 2013 (CN) .......................... 2013 1 0574069

(51) Int. Cl.
*H04M 3/42* (2006.01)
*H04M 3/436* (2006.01)
*H04M 1/2745* (2006.01)
*H04W 4/16* (2009.01)

(52) U.S. Cl.
CPC ....... *H04M 3/436* (2013.01); *H04M 1/274516* (2013.01); *H04M 3/42059* (2013.01); *H04W 4/16* (2013.01)

(58) Field of Classification Search
CPC .... H04M 15/00; H04M 15/08; H04M 15/47; H04M 2215/0148; H04M 2215/62; H04M 15/41; H04M 15/7655; H04M 15/77; H04M 1/6505; H04M 1/72519; H04M 2203/658; H04M 2215/0164; H04M 7/006; H04M 3/04; H04M 2207/12; H04M 3/436; H04M 3/4228; H04M 3/42059; H04M 3/42042; H04M 3/42102; H04M 2201/42; H04M 3/493; H04M 3/42374; H04M 2203/551; H04M 2207/18; H04M 3/2281; H04M 1/72577; H04M 2203/2016; H04M 7/0066; G06Q 30/0631; H04L 47/765; H04L 47/803; H04L 5/0037; H04W 4/16
See application file for complete search history.

(56) References Cited

U.S. PATENT DOCUMENTS 8,554,835 B1 * 10/2013 Williams ............... G06Q 50/01
705/319
2013/0173402 A1 * 7/2013 Young ................ G06Q 30/0631
705/14.73

(Continued)

*Primary Examiner* — Nimesh Patel
(74) *Attorney, Agent, or Firm* — Novick, Kim & Lee, PLLC; Allen Xue

(57) ABSTRACT

A method for marking a phone number and a system for marking a phone number are provided. Said method comprises: obtaining a phone number of an incoming call or a dialed call to/from a mobile terminal; performing matching process on the obtained phone number in at least one of a local database and a cloud database; based on whether or not said phone number is successfully matched in the local database or the cloud database and whether said phone number is a questioned number, displaying the user with different marking pages, to prompt the user to mark said phone number or confirm the marking information of said phone number; obtaining the marking information marked by the user to said phone number according to the marking page, and performing marking verification process on the marking information; and according to the result of the marking verification process, updating said cloud database and said local database.

18 Claims, 9 Drawing Sheets

(56) References Cited

U.S. PATENT DOCUMENTS

2014/0219430 A1* 8/2014 Daniel ............... H04M 3/436
                                                    379/142.05
2015/0117622 A1* 4/2015 Fandrianto .......... H04M 7/0066
                                                    379/93.05
2015/0140977 A1* 5/2015 Zhang ............... H04M 3/42059
                                                    455/415

* cited by examiner

Marking 138********* as:

32 user has marked this phone number

- real estate agent
- sales call
- telephone harassment
- fraudster
- delivery service
- manual input Sharing Store the phone number into the blacklist

| saved as a contact | confirmation |

Figure 8

Phone number marking:

138********belongs to RUFENG express delivery?

| NO | YES |

Store the phone number into the blacklist

I don't know

Figure 9

Phone number marking:

What type does 138******** belong to?

| headhunting | other type |

Store the phone number into the blacklist confirmation

Figure 10

Phone number marking:

If you find out that the identification information of this phone number is incorrect, please help us to correct it KFC restaurant at Merro mall ⓧ

| Cancel | Confirmation |

Figure 11

METHOD AND SYSTEM FOR MARKING A PHONE NUMBER

CROSS-REFERENCE TO RELATED PATENT APPLICATION

This application claims priority to Chinese Patent Application No. 201310574069.0 filed on Nov. 15, 2013, the disclosure of which is incorporated herein in its entirety by reference.

FIELD OF THE INVENTION

This invention relates to the field of data processing and especially to intelligent marking of phone numbers during mobile communication.

DESCRIPTION OF THE RELATED ART

Systems for marking a phone number are generated with an original intention of correlating the phone number with the entity that makes the call. The database in a conventional system for marking a phone number is normally a local database, which usually uses the following method to mark a phone number; for example, when a dialed call/incoming call from/to the user is monitored, a matching process is performed on the data of the phone number and the phone numbers in the database. If a matched phone number exists, information about such phone number is displayed on the mobile terminal. If a matched phone number does not exist, marking information of such phone number is not displayed or a prompt message "unknown number" is displayed. Contact book in the cell phone is an example of such case. Some conventional marking systems have very small scopes of identification, since contents in its database can only be updated by manually operating the database.

In recent years, with the spread of the popularity of mobile phone and the continuous development of cloud technology, some improved systems for marking a phone number are accordingly proposed. Wherein, after the user marks a number in the mobile terminal, the user can also transfer and store the marked data into a cloud server.

FIG. 1 shows a prior art system for marking a phone number, and it shows three mobile terminals 102, 104 and 106, three the local databases 108, 110 and 112 respectively corresponding to these three mobile terminals, three the marking device local terminals 120, 122 and 124 respectively corresponding to these three mobile terminals, and one cloud database 118. Wherein, local telephone communication monitor (not shown in the Figures) of the mobile terminal 102 monitors its own phone number/a called phone number, and triggers its corresponding marking device local terminal 120; and such marking device local terminal 120 provides the mobile terminal 102 with a marking interface, for the user to make marks. For example, in an embodiment, after the user receives a very important incoming call or receives a insurance selling call from a bank, the user correspondingly marks such number, and uploads the marking information into the cloud server via the marking device local terminal, so that it is guaranteed that the user can still obtain those marked phone numbers and corresponding marking information, even when the user changes his mobile phone or phone card.

However, in such number marking system, the user can only mark the phone number from which he/she has once receive an incoming call. That's to say, the databases used by different users to mark numbers are independent, thus only a small scope of numbers can be identified. Further, the user has to manually operate every number, thus the operation is tedious.

Further, as for different numbers, desirability of the user to mark such number is effectively different. As for some numbers such as delivery service, if they are not marked, it's inconvenient for the user to identify and contact; if they are marked, the frequency that the user would use them is very low. Moreover, staff mobility in delivery service business is high, thus it is unrealistic to mark every number.

SUMMARY OF THE INVENTION

The present invention provides a method for marking a phone number, characterized in that it comprises: obtaining a phone number of an incoming call or a dialed call to/from a mobile terminal; performing matching process on the obtained phone number in at least one of a local database and a cloud database; based on whether or not said phone number is successfully matched in the local database or the cloud database and whether said phone number is a questioned number, displaying the user with different marking pages, to prompt the user to mark said phone number or confirm the marking information of said phone number; obtaining the marking information marked by the user to said phone number according to the marking page, and performing marking verification process on the marking information; and according to the result of the marking verification process, updating said cloud database and said local database.

Preferably, if said phone number is successfully matched in said local database, the marking information corresponding is displayed to said phone number; if said phone number fails to get matched in said local database, the initial marking page is displayed to prompt the user to mark said phone number.

Preferably, if said phone number is successfully matched in said local database, it is further determined whether an instruction for correcting a mark exists; if there is no need to make correction, the marking information corresponding to said phone number is display; if correction is required, the marking correcting page is displayed to prompt the user to select or confirm the to-be-verified marking information; if said phone number fails to get matched in said cloud database, the initial marking page is display, so that the initial marking information marked by the user to said phone number is obtained.

The present invention also provides a system for marking a phone number, characterized in that it comprises: a plurality of the mobile terminal, for displaying the marking page and interacting with the user so as to obtain a phone number of an incoming call or a dialed call, display a marking page, and obtain the marking information of said phone number as marked by a user; a local database corresponding to said plurality of mobile terminal, for storing the phone number and marking information corresponding to the phone number; one or more cloud databases, for storing the phone number and the marking information corresponding to the phone number, and synchronizing the local database with the corresponding marking information; one or more marking devices, for dynamically providing an associated marking page according to a situation of whether or not the phone number obtained by the mobile terminal is matched in a cloud database or the local database, and delivering the obtained marking information to at least one of said local database and said cloud database; and one or more verifying devices, for verifying said marking information of the user. Said marking device also deliver the obtained marking information to said verifying device firstly, and stores the verified marking information into said cloud database or said local database; wherein, said mobile terminal communicates with said local database, or said cloud database, or said local database and said cloud database; said mobile terminal also communicates with said marking device; said marking device also communicates with said verifying device; said verifying device also communicates with at least one of said cloud database and said local database.

Preferably, said marking device may be arranged on said mobile terminal, may be arranged on the cloud side, or may consist of a portion that is arranged on said mobile terminal and a portion that is arranged on the cloud side. If said phone number is successfully matched in said local database, the marking information corresponding to said phone number is displayed via said mobile terminal. If said phone number fails to get matched in said local database, said marking device is triggered and the initial marking page is displayed to the user via said mobile terminal, so as to prompt the user to mark said phone number. If said phone number is successfully matched in said local database, it is further determined whether an instruction for correcting a mark exists; if there is no need to make correction, the marking information corresponding to said phone number is display; if correction is required, the marking correcting page is displayed to prompt the user to select or confirm the to-be-verified marking information; if said phone number fails to get matched in said cloud database, said marking device is triggered and the initial marking page is displayed to the user, so that the initial marking information marked by the user to said phone number is obtained.

Compared with the prior art, the present invention utilizes the bidirectional data transfer between the terminal user and the cloud server. When the terminal user invokes a telephone module of the system, the local monitoring system will record the calling phone number/the called phone number, the local/the cloud side number database identifying module is used to try to find out an associated marking information by matching process, so as to help the terminal user to recognize the identification of the telephone number and other auxiliary information. In an embodiment of the present invention, on one hand, the database accepts and makes full use of the marking information provided by each user, thus a huge and accurate database is formed by gathering, verifying and summarizing of the marking information. On the other hand, all the marking information is shared among all the mobile terminal user connected to the database, so that with the help of the marking information stored in the database, every terminal user when faced with a total strange phone number, is capable of accurately obtaining associated marking information of the unfamiliar number, thus effectively helping the terminal user to identify the number; therefore, telephone harassment got by the user is prevented or reduced.

The present invention also triggers the marking device in light of the matching result, and under different situations, for example whether or not matched marking information exists, whether or not it is the questioned number, whether or not active marking is needed and so on, in order to display the user with different marking information interface; and even when different users calls/receives a call from a same telephone number, different marking interfaces will be seen so that the user can more efficiently realize making process, and data about the telephone number provided by the user to the database becomes more efficient.

Further, the present invention sets many types of telephone numbers, and as for some phone numbers such as delivery service, which have no need to be marked with a specific identity, the user can directly mark such telephone number as a corresponding telephone number type. Therefore, while actual demand of the user for marking different telephone numbers is satisfied, the number of telephone numbers that need to be marked by the user reduces.

BRIEF DESCRIPTION OF THE DRAWINGS

By reading following detailed description of non-limiting embodiments with reference to the accompany figures, other features, objects and advantages of the present invention will become more obvious:

FIG. 8 shows a schematic diagram of basic phone number marking page in a specific embodiment of the present invention;

FIG. 9 shows a schematic diagram of dynamic phone number marking page in another specific embodiment of the present invention;

FIG. 10 shows a schematic diagram of dynamic phone number marking page in yet another specific embodiment of the present invention; and FIG. 11 shows a schematic diagram of dynamic phone number marking page in yet another specific embodiment of the present invention.

DETAILED DESCRIPTION OF THE PREFERRED EMBODIMENTS

Now, some exemplary embodiments will be described more comprehensively with reference to the Figure.

Figure 2:
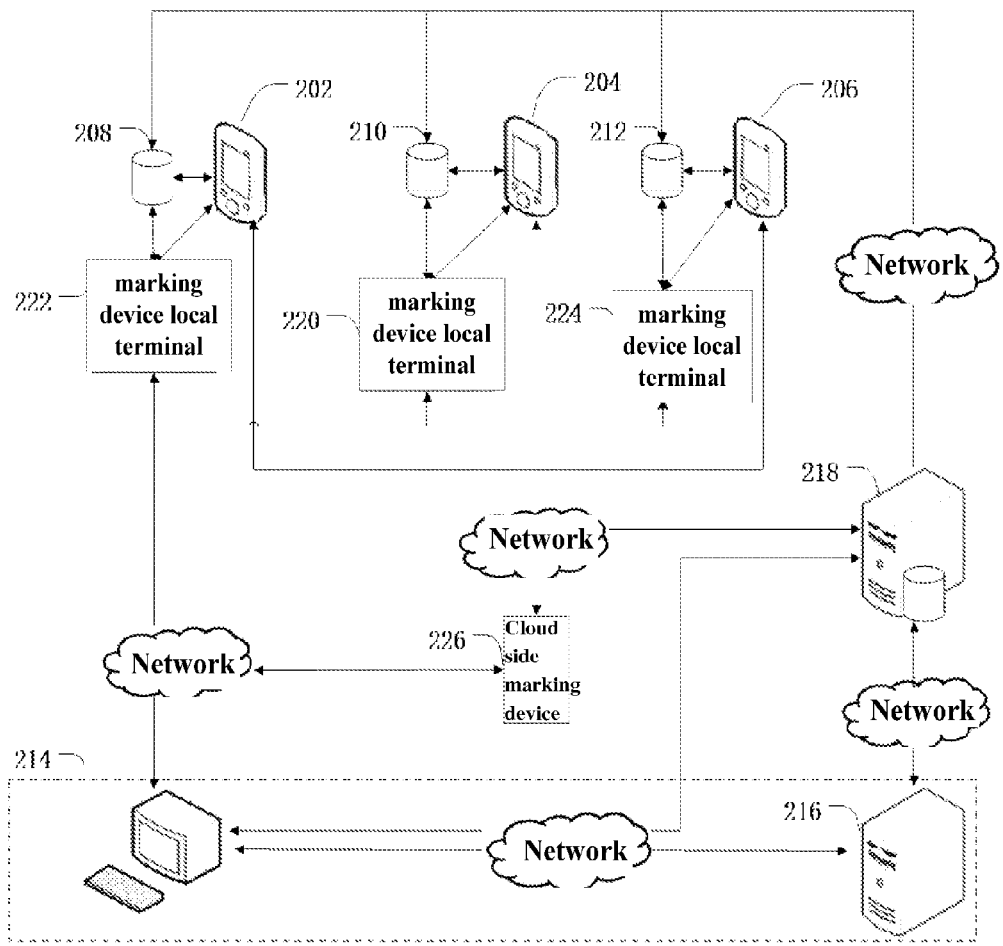
FIG. 2 shows a topological graph of en embodiment of a system for marking a phone number provided by the present invention.

FIG. 2 shows a topological graph of the system for marking a phone number provided by the present invention. Specifically, this Figure shows three mobile terminals 202, 204 and 206; three local databases 208, 210 and 212 respectively corresponding to those three mobile terminals; three marking device local terminals 220, 222 and 224 respectively corresponding to those three mobile terminals; one cloud database 218; one cloud side marking device 226; and a verifying device 214. Wherein, the verifying device 214 may include a plurality of verifying devices (not shown in the Figures), and may also include one or more (not shown) third-party server 216.

the mobile terminal 202 communicates with the local database 208 and the marking device local terminal 220; the local database 208 communicates with the marking device local terminal 220. The mobile terminal 202 communicates with the cloud side marking device 226 and the cloud database 218 via internet. The marking device local terminal 220 and the cloud side marking device 226 communicate with the verifying device 214 via internet. The verifying device 214 communicates with the cloud database 218 via internet. A third-party system 216 communicates with the verifying device 214 and the cloud database 218 respectively via internet. the cloud database 218 communicates with the local database 208. the mobile terminal 204 and its local database 210, the marking device local terminal 212, the mobile terminal 206 and its the local database 212, the marking device local terminal 224 communicate with other devices in a same way with that the mobile terminal 202 and its local database 208, the marking device local terminal 220 communicate with other devices.

Specifically, the mobile terminal 202 is taken as an example. The mobile terminal 202 conducts bidirectional data transfer with respective devices on the cloud side. When the mobile terminal 202 invokes a telephone monitoring module (not shown in the Figures) of the system for marking a phone number, the local monitoring module will record the calling number/the called number, performs a matching process on the phone number in the local database 208 or the cloud database 218, and inquires the identity of and relevant information about the phone number, so as to help the terminal user to identify it. In the mean time, the marking information is used to trigger the marking device local terminal 220 or the cloud side marking device 226, and different marking interfaces are displayed to different users; thus, even if different users calls/receive a call from a same phone number, they might see different marking interfaces. The user may provide the verifying device 214 with more efficient phone number data. The phone number data is verified by the verifying device 214, so that marking information that is verified to be correct is stored into the cloud database 218, and is transferred to local databases of mobile terminals of phone numbers that a telephone call is made to or received from in the future. Wherein, the data of phone numbers in the cloud database 218 may be mutually updated with the third-party system 216. The verifying device 214 may verify the phone number marked by the user by using information from the third-party system 216, so as to form a more accurate and faster system for the terminal user to contribute phone numbers, thus the phone number database is efficiently enlarged; and it may help the terminal user to identify the marking information of a non-contact phone number when making a call or receiving a call, so that the user won't be harassed by an irrelevant strange phone number.

Figure 1:
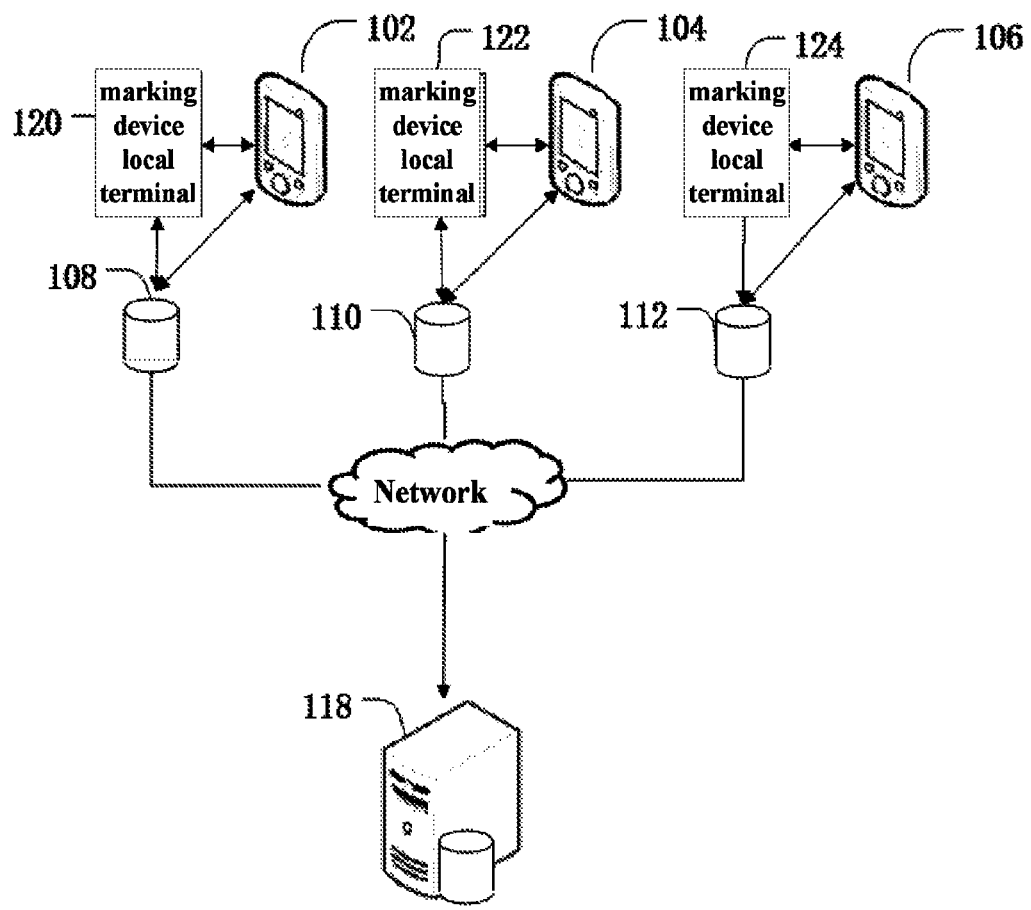
FIG. 1 shows a topological graph of the system for marking a phone number in the prior art.

Wherein, FIG. 2 specifically shows and describes an illustrative embodiment of the present invention. It is appreciated that, the present invention is limited to those disclosed embodiment. For example, the number of above-mentioned mobile terminals, local databases and marking devices is not necessarily to be three as shown in FIG. 1, and their number can vary correspondingly. Furthermore, the numbers of the cloud database, the verifying device and the third-party system can vary correspondingly. For example, the verifying device, the marking device and the third-party system can run on the cloud side; and cloud-side devices such as a plurality of cloud databases, a plurality of verifying devices, a plurality of marking devices and a plurality of third-party systems are assigned with tasks by one or more cloud servers.

In a modified example, the marking device local terminal is a sub-module of software installed locally, for providing a marking page used to locally trigger a marking process. The cloud side marking devices is a sub-module of the cloud server, for providing a marking page used to trigger a marking process at the cloud side.

Figure 3:
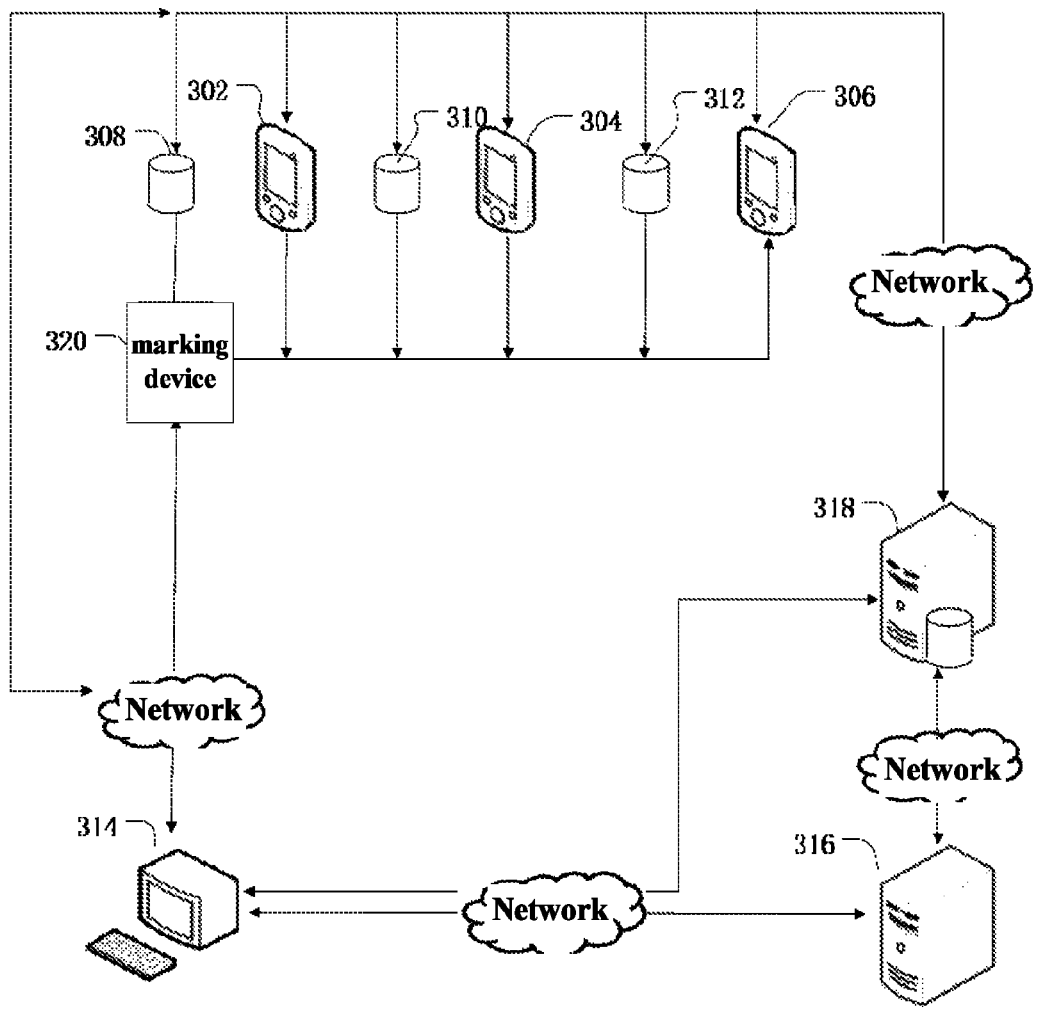
FIG. 3 shows a topological graph of another embodiment of a system for marking a phone number by the present invention.

In another modified example, it make no difference whether the marking device is a local one or a cloud-side one; in fact, the marking device can only installed locally, can only installed on the cloud side, or also can be a device that is neither installed locally nor installed on the cloud side. Referring to FIG. 3, the mobile terminal 302 communicates with the local database 308; the mobile terminal 304 communicates with the local database 310; the mobile terminal 306 communicates with the local database 312; the mobile terminal 302, 304, 306 and the local database 308, 310, 312 respectively communicate via interne with the marking device 326, the cloud database 318 and the verifying device 314.

Specifically, the mobile terminal 302 is taken as an example. The mobile terminal 302 records the calling number/the called number, performs a matching process on the phone number in the local database 308 or the cloud database 318, and inquires the marking information of the phone number, so as to help the terminal user to identify it. On the other hand, the marking device 320 is triggered according to the matching result, and different marking interfaces are displayed to different users; thus, even if different users calls/receive a call from a same phone number, they might see different marking interfaces.

For example, when no matched result is found in the local database 308 or the cloud database 318 with respect to the phone number, the marking device 320 may provides the user with an interface for active marking process, instructing the user to actively make an initial marking to such phone number. When the user of the mobile terminal 302 has doubt on the existing marking information of the phone number, the marking device 320 may provide the user with an interface for correcting the marking, instructing the user to correct the marking information of the phone number.

The result obtained by the user's marking action is recorded in the cloud database 318. When other mobile terminals inquires the matching situation of the phone number, result obtained by marking action of the user of the mobile terminal 302 will be pushed to the marking interfaces of those other mobile terminals, for the users of those other mobile terminals to select or confirm.

The marking result marked by the mobile terminal 302 may be previously verified by the verifying device, and then the verified marking information will be updated to the cloud database as matching result of the phone number. The marking information in the cloud database may be further updated to the local database, for the user to inquire and match off line.

Figure 4:
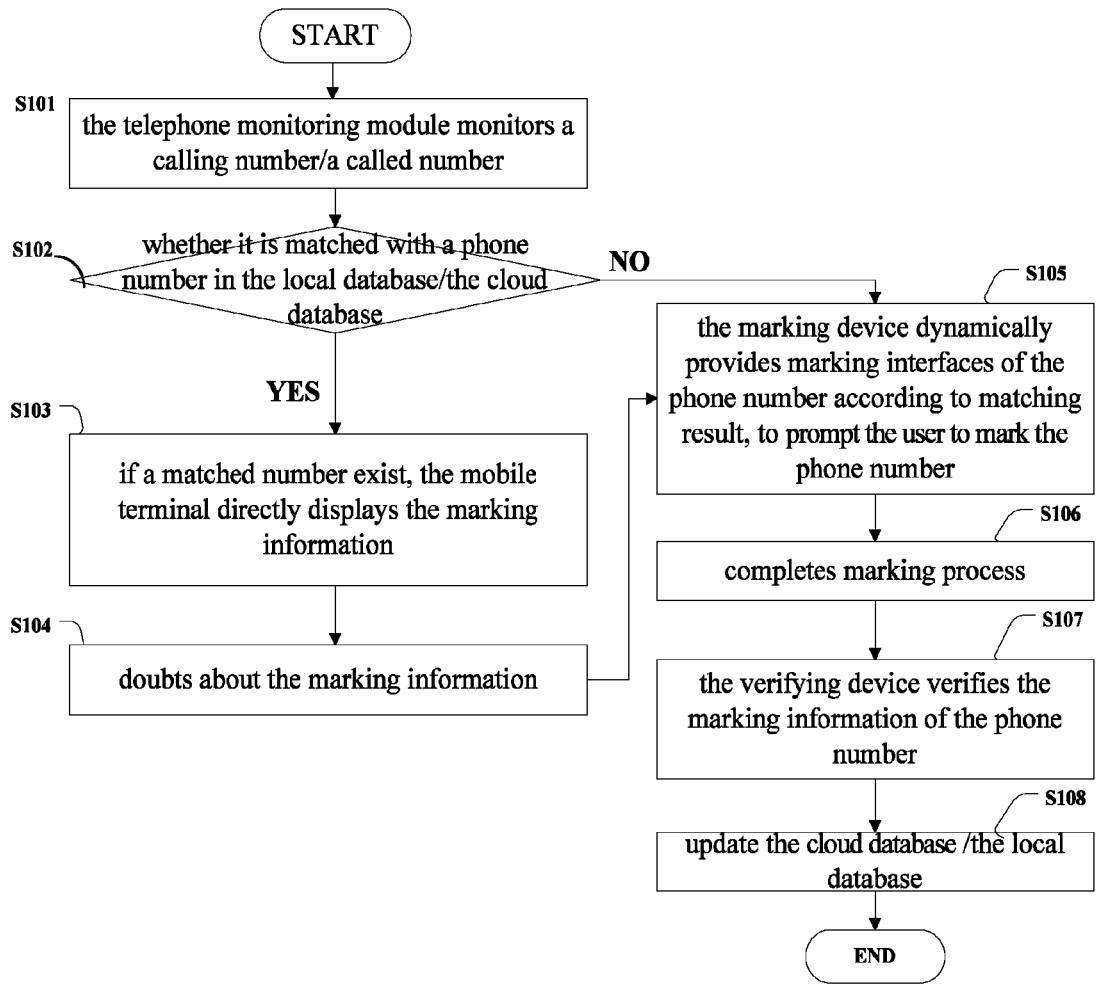
FIG. 4 shows a flow diagram of a method for marking a phone number of a first embodiment of the present invention.

FIG. 4 shows a flow chart of the method for marking a phone number of the first embodiment of the present invention. Specifically, this Figure shows 8 steps.

A step S101: the telephone monitoring module monitors a calling number/a called number.

Specifically, when the mobile terminal dials the phone number or receives a call, the telephone monitoring module obtains the phone number that the mobile terminal dials or the phone number that is calling.

A step S102: it is determined whether the phone number is matched with a phone number in the local database/the cloud database.

if a phone number or marking information that is matched with the phone number exists in the local database or the cloud database, a step S103 is performed; if there is no phone number or marking information that is matched with the phone number, a step S105 is performed.

Specifically, according to the phone number obtained by the telephone monitoring module, inquiring and matching process is performed in at least one of the local database/the cloud database.

Preferably, if the mobile terminal is not in a network-connected state, the inquiring and matching process on the phone number is directly performed in the local database. If the mobile terminal is in a network-connected state, the inquiring and matching process on the phone number may preferentially be performed in the cloud database. In a modified example, if network bandwidth of the mobile terminal exceeds a threshold, the inquiring and matching process on the phone number is performed in the cloud database. If network bandwidth of the mobile terminal is lower than said threshold, the inquiring and matching process on the phone number is directly performed in the local database.

In another modified example, based on the setting of the user, no matter whether the mobile terminal is in a network-connected state or not, the inquiring and matching process on the phone number may preferentially be performed in the local database, and when the matching process fails, the user to is prompt to get connected to the interne or to directly perform inquiring process in the cloud database.

A step S103: if a matched number exist, the mobile terminal will directly display the marking information in the local database/the cloud database, which is matched with the phone number. Specifically, when the phone number is successfully matched, the type of the phone number can be displayed. For example, the phone number is displayed as a phone number of "a real estate agent", or is displayed as a phone number of "a sales call". As for some phone number, the user in fact has no need to mark out the specific identity of such number, and the phone number type is enough for the user. Wherein, the user can also add, delete and edit the phone number based on his/her own demand, so that the phone number types are more suitable for the habit of the user. In a specific embodiment, phone number types set by a user may only stored in the local database, or may be stored in the cloud database; and when necessary, the user may also share the phone number types set by himself/herself with a contact designated by the user, or the user may publish them through designated social networking accounts.

Specifically, when such phone number is successfully matched, its phone number information may also be displayed. For example, when the phone number information is displayed, information such as a contact corresponding to the phone number or the name, address or business card and the like of a merchant corresponding to the phone number is displayed; also, for example, information about activities of the merchant corresponding to the phone number is displayed, such as recent discounts information and so on.

Specifically, when the phone number is successfully matched, associated reminder message may also be displayed. For example, a message of "the phone number has been marked as telephone harassment by N users" or "the phone number has been marked as a real estate agent by N users" and the like may be displayed, so as to warn the user to keep a wary eye on the phone numbers that has been marked as telephone harassment or fraudster by other users but not been verified yet.

Specifically, when the phone number is successfully matched, the user may be prompted to confirm the marking result.

A step S104: if the user believes that the marking information does not agree with facts, a step S105 is performed.

Specifically, usually, when the user hangs up the phone, the user is asked whether or not to confirm the marking information, or the user is asked whether or not to actively mark the number, if the user believes that the marking information is incorrect or believes that he/she want to actively mark the phone number, a step S105 is performed. A step S105: the marking device dynamically provides marking interfaces of the phone number according to matching result, to prompt the user to mark the phone number.

In an embodiment, when the local database/the cloud database has no marking information that is matched with the phone number, the marking device is triggered, so as to display an initial marking interface. Referring to FIG. 8, the marking page as shown in the Figure provides the user with options that would be chosen to mark the phone number as corresponding phone number type. For example, the phone number belongs to "a sales call? a real estate agent? telephone harassment? fraudster? delivery service? others (manual input)", the user can select one of them to complete the marking of the phone number. In another embodiment, when the local database/the cloud database has no marking information that is matched with the phone number, the initial marking interface may also prompt the user to directly manually input, thus actively marking the phone number. Preferably, under such circumstance, when the user hangs up, the marking device is triggered, so that the initial marking interface pops out.

In another embodiment, when the local database/the cloud database has marking information that is matched with the phone number, but the user believes that such matched marking information is incorrect, the marking device displays a marking correcting page, so as to prompt the user to correct the mark of the phone number.

For example, referring to FIG. 9, the marking correcting page may prompt the user to confirm the existing matched marking information, which is "whether 13XXXXXXXXX belongs to RUFENG express delivery". Also, for example, referring to FIG. 10, when an instruction for the user to actively make a mark is received, the marking correcting page prompts the user to select among one or more marked phone number types with respect to the phone number, i.e. to make sure whether the phone number belongs to a default personnel headhunting or other type. Also, for example, referring to FIG. 11, the user performs manual input directly according to the displayed marking correcting page, in order to actively mark the phone number.

In another modified example, during the matching process in the local database with respect to the phone number, when the local database has marking information matched with the phone number, at this time, even if the cloud database has a plurality of to-be-verified marking information with respect to the phone number, the system will not actively provide the marking correcting page, instead, it will by default takes the marking information in the local database as marking information matched with the phone number. Only when the user issues a mark correcting instruction, i.e. only when the user probably believes that the marking information of the phone number is incorrect or has no incredibility, the marking device is actively triggered, and at this time, the marking correcting page will pop out for the user to correct the mark.

A step S106: marking process is completed by interacting with the user.

Wherein, other than completing the input operation by the keyboard of the mobile terminal, a virtual keyboard, a mouse, a joystick, handwriting input or ORC technology, the user can also complete initial marking or correcting marking of the phone number by voice interaction technology, two-dimension code identification technology and the like.

Additionally, a step S107 may be included, wherein the verifying device verifies the marking information of the phone number.

Specifically, there are many verification methods.

In an embodiment, the verifying device counts the times that a certain phone number is marked as certain marking information. If such certain marking information for such certain phone number exceeds a predetermined threshold, it passes the verification. For example, when times that a certain phone number is marked as a real estate agent exceeds the predetermined threshold (for example, 300 peoples mark it as a real estate agent), the phone number is verified as a real estate agent.

In another embodiment, the verifying device counts the times that a certain phone number is marked as certain marking information during a predetermined time period. When such certain marking information for such certain phone number exceeds a predetermined threshold, it passes the verification. For example, as for a fraudster, he/she usually frequently calls multiple users during a time period to practice fraudulent act; if during one day, times that such marking information is marked to the phone number exceeds the predetermined threshold, the phone number is verified as a fraudster.

In yet another embodiment, the verifying device assigns different marking information weights to different users according to different credit rating of those different users, and calculates credit degree of the marking information according to weights. When the credit degree of the marking information reaches a predetermined threshold, it passes the verification. For example, different credit ratings may be set to a user according to the previous marking result of the user; when marking information of the phone number is counted, the credit rating of the user who provides such marking information is also counted, and the counted credit degree is compared with a predetermined threshold, then whether or not it passes verification is determined based on the comparison result.

During above verification procedure, when the user makes marks, the verifying device may record the device information of the user, and takes it as unique code for the identity of the marking information provider. When the same user makes multiple times of correcting marking to a same phone number, the system will only accept the marking correcting information once. Additionally, the verifying device may also record the geographic position information about where the user is currently located. When the user marks a phone number as a nationwide merchant, the system will automatically add its geographic position information onto the marking information, so that more accurate matching is possible. Also, for example, the verification can also be performed in connection with a database of a third-party system.

On basis of verification, a step S108 is performed subsequently, wherein the cloud database /the local database is updated according to the result of verification.

Specifically, if the marking information of the phone number passes the verification, the verified marking information is taken as the marking information of the phone number so as to be stored into the cloud database/the local database. If the phone number or the marking information stored in the local/cloud-side phone number database is questioned, the marking correcting information of the user may be recorded and stored in the cloud side number database; and the phone number and the marking information of the phone number may be deleted from the local database; the phone number is set as a questioned number in the cloud database. In a modified example, the phone number and the marking information of the phone number are not deleted from the local database; the marking correcting information of the user is recorded and stored in the cloud side number database; and the phone number is set as a questioned number in the cloud database. In another modified example, the marking correcting information of the questioned phone number is updated and stored in the cloud database; the phone number and its marking correcting information in the cloud database are verified; further, the local database only store verified phone number and its marking information.

In above embodiments, after the marking information of the user is verified, and then the cloud database and the local database are updated according to the result of verification. Thus, before verification, the initial marking information and the marking correcting information that are marked by each user himself/herself as well as the existing marking information in the cloud database and/or the local database could all be used as information that is matched with the phone number recorded in the mobile terminal operated by the user, thus forming a huge, accurate the database. In another embodiment, the marking information marked by different users may be immediately uploaded to the cloud database, as the to-be-verified marking information of the phone number; then, when a user of other mobile terminal performs inquiring and matching process on the phone number via cloud-side phone number database, one or more to-be-verified marking information that is provided by other different users in the past and is associated with the phone number can be obtained; the marking page may prompt the user to make choice from them, or may prompt the user to confirm it, or may prompt the user to input by himself/herself so as to make other mark on the phone number. Thus, even when the user is faced with a total strange phone number, the user is capable of its associated marking information.

Figure 5:
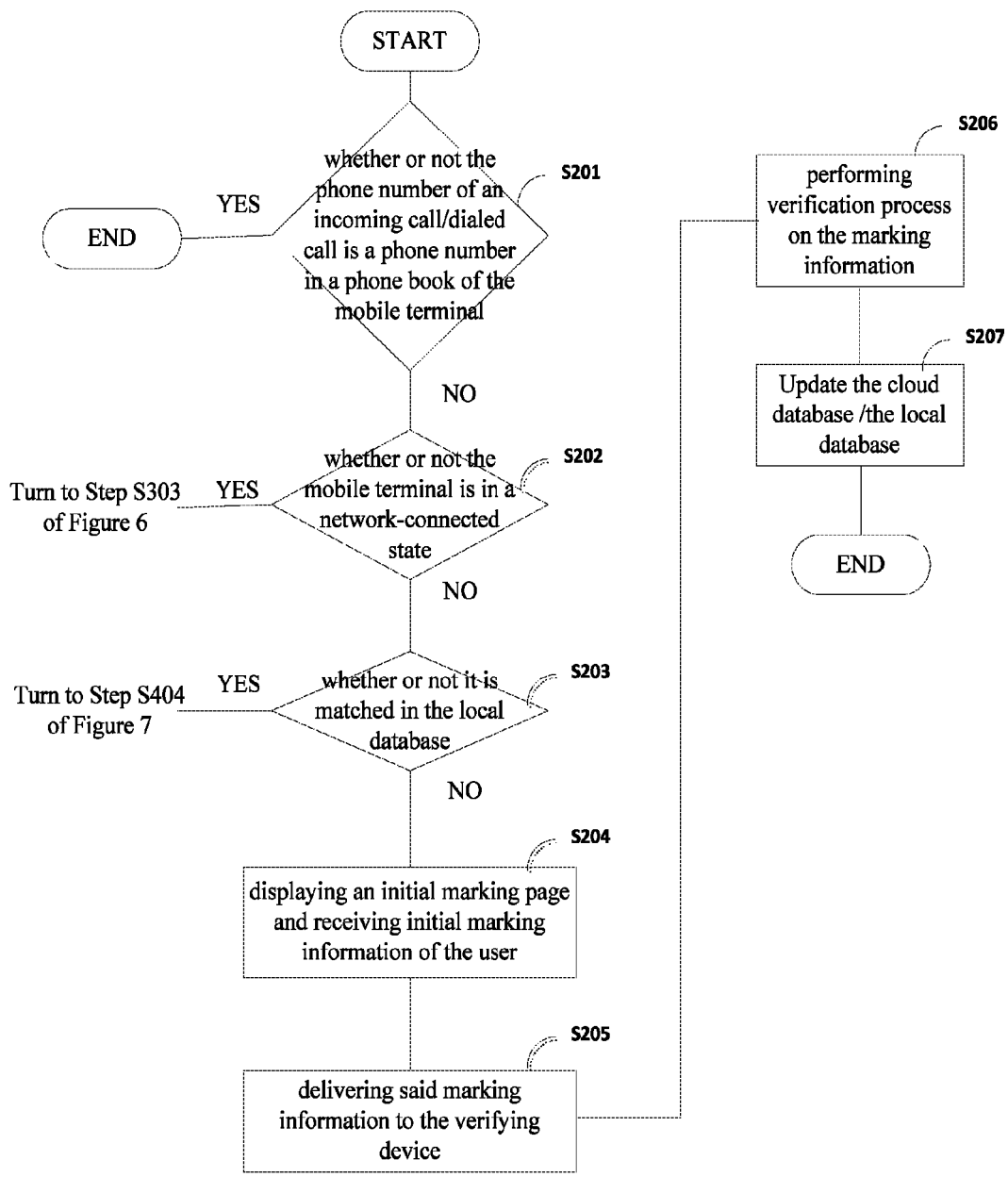
FIG. 5 shows a flow diagram of a method for marking a phone number of a second embodiment of the present invention.

FIG. 5 shows a flow diagram of a method for marking a phone number of a specific embodiment of the present invention.

A step S201: determining whether or not the phone number of an incoming call/dialed call is a phone number in a phone book of the mobile terminal, and if not, a step S202 is performed.

Figure 6:
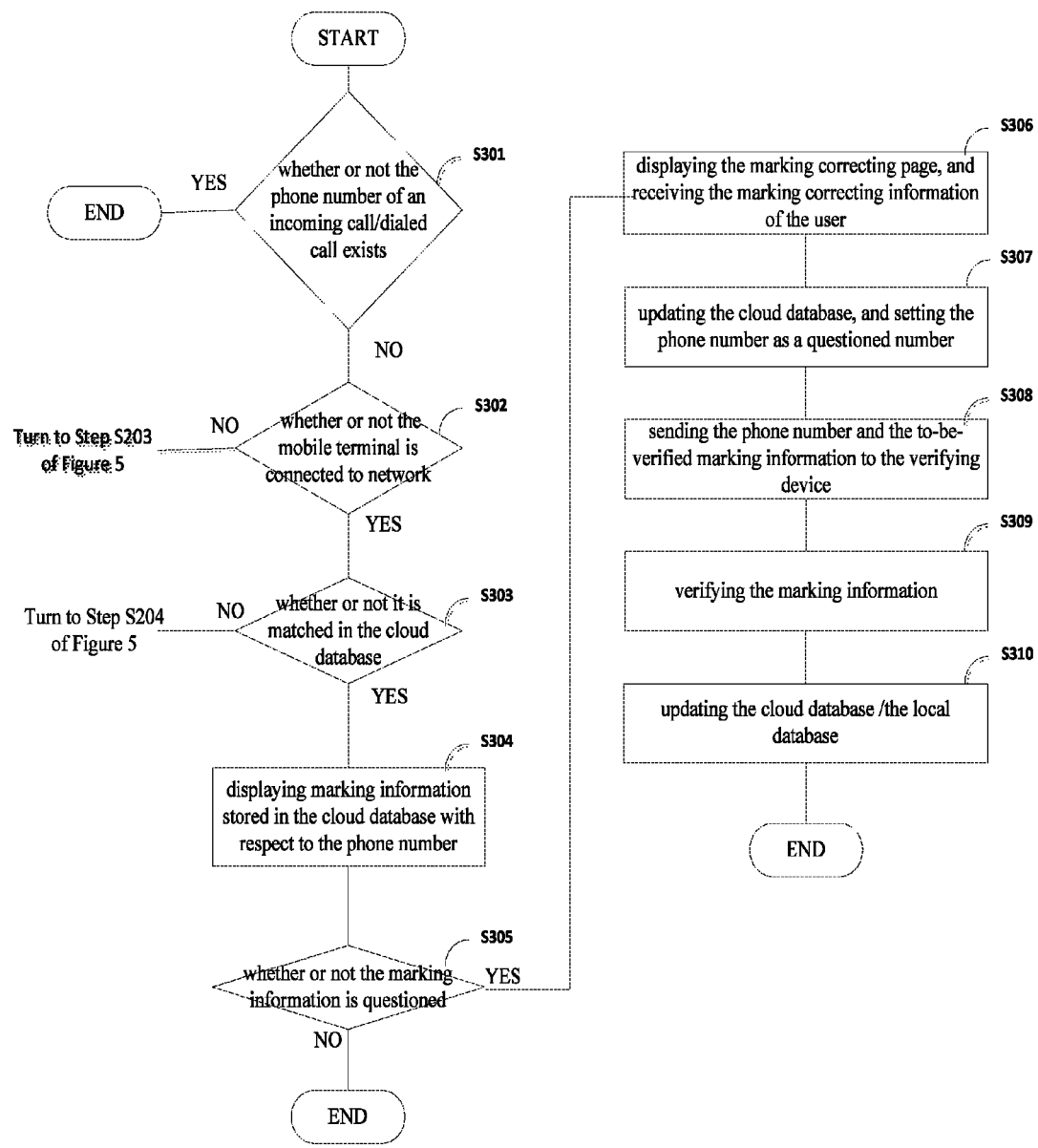
FIG. 6 shows a flow diagram of a method for marking a phone number of a third embodiment of the present invention.

A step S202: determining whether or not the mobile terminal is in a network-connected state; if it isn't in a network-connected state, the step S203 is performed, and if it is in a network-connected state, FIG. 6 the step S303 is performed.

Figure 7:
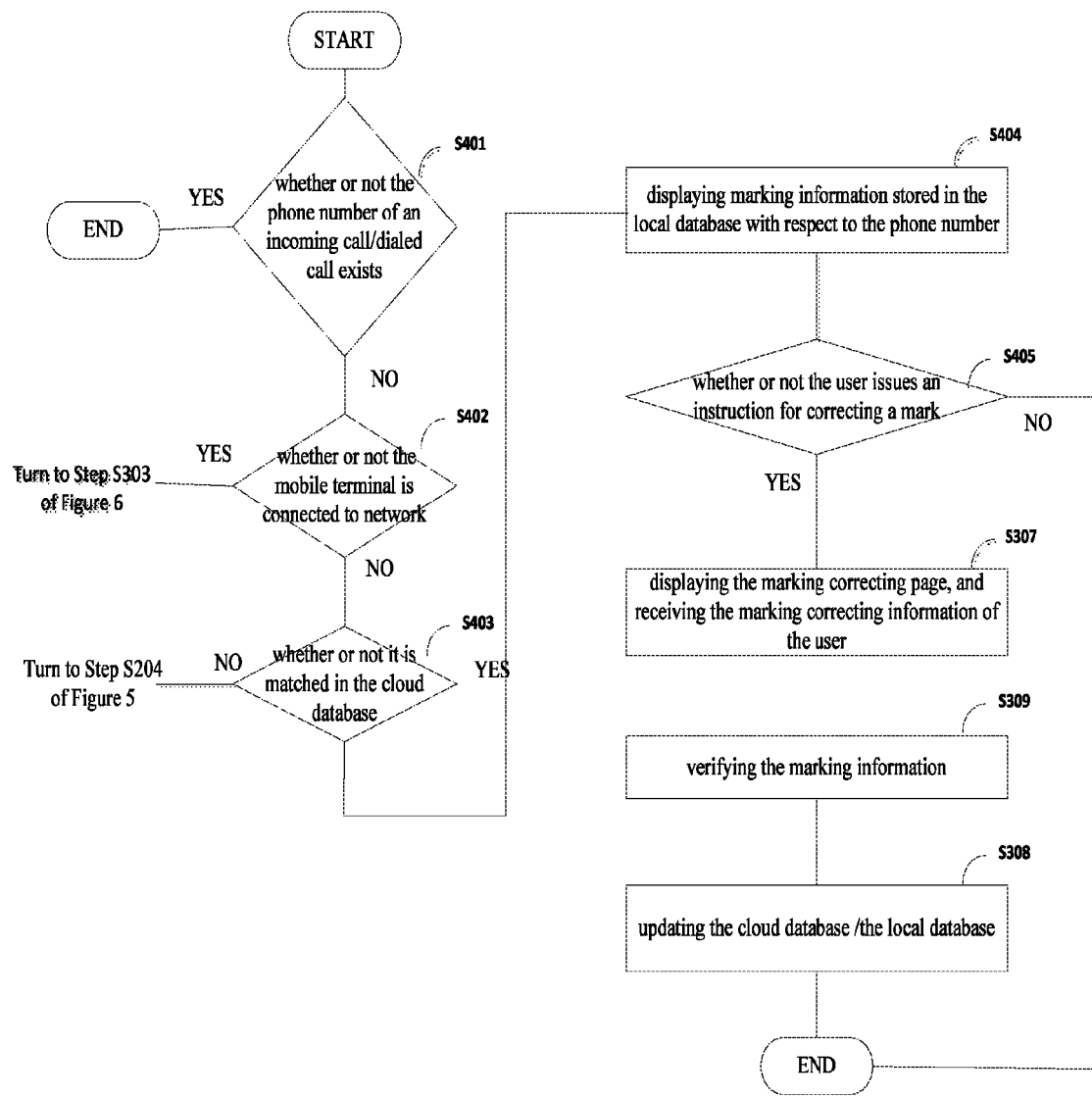
FIG. 7 shows a flow diagram of a method for marking a phone number of a fourth embodiment of the present invention.

A step S203: determining whether or not the phone number is matched with any phone number of the local database; and if it fails to get matched, a step S204 is performed, if it is matched, the step S404 of FIG. 7 is performed.

A step S204: triggering the marking device, thus dynamically providing an associated initial marking page, and receiving the marking information of the user.

In an embodiment, there is has no marking information in the local database that is matched with the phone number, and the marking interface prompts the user to perform initial marking, and requests the user to select the type of the phone number of an incoming call/dialed call. For example, referring to FIG. 8, options of "a sales call", "a real estate agent", "telephone harassment", "fraudster", "delivery service", "other (manual input)" for such phone number are provided.

The initial marking interface may be triggered by operations set by the user. For example, when the user hangs up, the marking device may be triggered, and the initial marking interface is displayed. In another modified example, the initial marking interface may be actively triggered by the user.

After the marking information of the user is received, a step S205 is performed, where said marking information is delivered to the verifying device for marking verification process.

In an embodiment, the marking information of the user is preferably sent to the verifying device by the marking device. In a modified example, the marking device stores the marking information of the user into the local database, and the marking information is sent to the verifying device by the local database.

Preferably, when it is determined that the mobile terminal is connected to the network, the phone number and its associated marking information in the local database are sent to the verifying device in real time. In a modified example, at a specified time interval, the marking information of the user stored in the local database is sent to the verifying device. In another modified example, when the marking information of the user reaches a certain threshold, the marking information of the user stored in the local database is sent to the verifying device. At the step S206, the verifying device performs verification process according to the marking information of the user.

Specifically, there are many verification methods.

For example, if times that a certain phone number is marked as a certain marking information exceeds the predetermined threshold, it passes the verification.

Also, for example, during a predetermined time period, times that a certain phone number is marked as certain marking information exceeds the predetermined threshold, it passes the verification.

Again, for example, different credit rating of different users are assigned with different marking information weights, and the credit degree of the marking information is calculated according to such weights; when the credit degree of the marking information reaches a predetermined threshold, it passes the verification.

Again, for example, database of the third-party system may be used to perform further verification.

A step S207: according to the verification result, updating the local database/the cloud database, recording corresponding phone number and its marking information, and storing them into the cloud database.

Preferably, when it is determined that the mobile terminal is connected to the network, the local database and the cloud database are synchronized and updated in real time. In a modified example, at a specified time interval, the local database and the cloud database are synchronized and updated. In another modified example, when the number of updated phone number and its marking information reaches a certain threshold, the local database and the cloud database are synchronized and updated.

FIG. 6 shows a flow diagram of a method for marking a phone number of the third embodiment of the present invention.

A step S301: determining whether or not the phone number of an incoming call/dialed call is a phone number in the phone number book of the mobile terminal, and if it is not, a step S302 is performed.

A step S302: determining whether or not the mobile terminal is in a network-connected state; if it is connected to the network, a step S303 is performed, and if it is not connected to the network, a step S203 of FIG. 5 is performed.

A step S303: determining whether or not the phone number is matched with a phone number in the cloud database; if it is matched, a step S304 is performed, and if it is not matched, a step S204 of FIG. 5 is matched.

A step S304: displaying marking information in the cloud database with respect to the phone number.

A step S305: determining whether or not the marking information of the phone number in the cloud database is questioned, and if it is questioned, the step S306 is matched.

A step S306: triggering the marking device, displaying the marking correcting page via the mobile terminal, and receiving the marking correcting information of the user.

In an embodiment, there are more than one to-be-verified marking information in the cloud side number database, which are matched with the phone number; then the marking correcting interface may list one or more of a plurality of to-be-verified marking information that is associated with the phone number and is stored in the cloud database at once or one by one, so as to prompt the user to make choice. Referring to FIG. 9 or FIG. 10, the details are omitted here for clarity.

In another embodiment, referring to FIG. 11, the marking correcting interface may also prompt the user to make self-defined marks.

The marking correcting interface may be triggered by preset user operations. For example, when the user hangs up, the marking device is triggered, and the marking correcting interface is displayed. In another modified example, the marking correcting interface may also be actively triggered by the user. For example, when the user is questioning the matched marking information, the marking device may be actively triggered, and the marking interface is displayed.

A step S307: updating the cloud database, and setting the phone number as a questioned number and saving associated marking information.

A step S308: sending the phone number and the to-be-verified marking information to the verifying device.

In an embodiment, the to-be-verified marking information is preferably sent to the verifying device by the marking device. In a modified example, the marking device stores the to-be-verified marking information of the user into the cloud database or the local database, and is sent to the verifying device by the cloud database or the local database.

Preferably, the to-be-verified marking information in the cloud database or the local database is sent to the verifying device in real time, when it is determined that the mobile terminal is connected to network. In a modified example, at a specified time interval, the cloud database or the local database sends the to-be-verified marking information stored in the cloud database or the local database to the verifying device. In another modified example, when the to-be-verified marking information reaches a certain threshold, the to-be-verified marking information stored in the cloud database or the local database is sent to the verifying device. In another modified example, the to-be-verified marking information may includes the initial marking information and the marking correcting information, and uploading method of those two information may be different methods. For example, the marking correcting information is uploaded in real time, and the initial marking information is uploaded at a specified time interval. A person skilled in the art may make more modifications in connection with the prior art, and the details are omitted here for clarity.

A step S309: the verifying device verifying according to the marking information of the user.

Specifically, there are many verification methods.

For example, if times that a certain phone number is marked as a certain marking information exceeds the predetermined threshold, it passes the verification.

Again, for example, during a predetermined time period, times that a certain phone number is marked as certain marking information exceeds the predetermined threshold, it passes the verification.

Again, for example, different credit rating of different users are assigned with different marking information weights, and the credit degree of the marking information is calculated according to such weights; when the credit degree of the marking information reaches a predetermined threshold, it passes the verification.

Again, for example, database of the third-party system may be used to perform further verification.

In addition, the initial marking information and the marking correcting information may have different verifying methods. For example, the initial marking information may be verified as follows: when times that a phone number is marked as the initial marking information reaches the predetermined threshold, the initial marking information passes verification. The marking correcting information may be verified as follows: different credit ratings of different users are assigned with different marking correcting information weights, and the credit degrees of the marking correcting information are calculated according to the weights; when the credit degree of the marking correcting information reaches a predetermined threshold, it passes the verification. It is the fact that different verifying methods are set to the initial marking information and the marking correcting information based on properties of the initial marking information and the marking correcting information; the initial marking information represent initial identification of a phone number when the local database/the cloud database has no data about the phone number, while the marking correcting information represents correction of the existing marking information in the local database/the cloud database. Applying different verifying methods to those two can improve the efficiency of verification result, so that more unfamiliar numbers can be identified by the user in time, and the phone numbers in the database have higher accuracy. In other embodiments, the initial marking information and the marking correcting information may use a same verifying method, so as to simplify calculation complexity.

A step S310: when the verification is passed, the cloud database and the local database are updated. Preferably, only the marking information that pass the verification and its corresponding phone numbers in the cloud database are synchronized to the local database. In a modified example, when the verification is not passed, the marking information of the questioned number is saved in the cloud database, but the marking information of the questioned number is deleted from the local database.

Preferably, when it is determined that the mobile terminal is connected to the network, the local database and the cloud database are synchronized and updated in real time. In a modified example, at a specified time interval, the local database and the cloud database are synchronized and updated. In another modified example, when the number of updated information reaches a certain threshold, the local database and the cloud database are synchronized and updated.

In a modification of above embodiment, before the step S304, it is determined whether or not the phone number is a questioned number, if the phone number is not a questioned number, then the step S304 is performed. If the phone number is a questioned number, the marking device is triggered, the marking correcting page is displayed via the mobile terminal, and the marking correcting information of the user is received.

In an embodiment, there are more than one to-be-verified marking information in the cloud side number database, which are matched with the phone number; then referring to FIG. 9 or FIG. 10, the marking correcting interface as shown in the Figures may list one or more of a plurality of to-be-verified marking information that is associated with the phone number and is stored in the cloud database at once or one by one, so as to prompt the user to make choice. For example, in a modified example, when a phone number has only one to-be-verified marking information, a dynamic marking page preferably inquires the user whether the phone number is a to-be-verified marking information. For example, "whether the phone number is a real estate agent" is inquire; or, the marking correcting page inquires whether the user phone number is to-be-verified marking information or other information, for example, "whether or not the phone number belongs to a real estate agent or other type (manual input)". Also, for example, In another modified example, one phone number has a plurality of to-be-verified marking information, then the marking correcting page preferably inquires the user whether or not phone number is the first the to-be-verified marking information, the second the to-be-verified marking information or other information, for example, "whether or not the phone number belongs to a real estate agent, a sales call, or other type (manual input)".

After the marking correcting information of the user is received, the steps are specifically similar to the step S308 to the step S310, and the details are omitted here for clarity.

FIG. 7 shows a flow chart of the method for marking a phone number of the fourth embodiment of the present invention.

A step S401: determining whether or not the phone number of an incoming call/dialed call is a phone number in a phone book of the mobile terminal, and if not, a step S402 is performed.

A step S402: determining whether or not the mobile terminal is in a network-connected state; if it is in a network-unconnected state, a step S403 is performed, and if is in a network-connected state, a step S303 of FIG. 6 is performed.

A step S403: determining whether or not the phone number is matched with a phone number in the cloud database; if it is matched, a step S404 is performed, and if it is not matched, a step S204 of FIG. 5 is performed.

A step S404: marking information of the phone number is displayed stored in the local database in the mobile terminal.

A step S405: determining whether or not the user issues an instruction for correcting a mark. In an embodiment, after the user hangs up, the user is inquired about whether or not to confirm the marking information, i.e. the user is inquired about whether or not to actively correct the marking information of the phone number. When it is determined that the user issues an instruction for correcting a mark, a step S406 is performed.

A step S406: the marking device is triggered, the marking correcting page is displayed via the mobile terminal, and the marking information of the user is received. In an embodiment, the marking correcting interface requests the user to choose the phone number type of the phone number of an incoming call/dialed call. For example, options that would be chosen to mark the phone number as "a sales call", "a real estate agent", "telephone harassment", "fraudster", "delivery service", "others (manual input) " are given. In another embodiment, referring to FIG. 9 or FIG. 10, by means of a marking correcting interface like that is shown in such Figure, the user is prompted to confirm the existing matched marking information or to choose a phone number type. In yet another embodiment, referring to FIG. 11, the marking correcting interface may also prompt the user to make self-defined marks.

A step S407: the verifying device performing a verification process according to the marking information of the user.

Specifically, there are many verification methods.

For example, if times that a certain phone number is marked as a certain marking information exceeds the predetermined threshold, it passes the verification.

Again, for example, during a predetermined time period, times that a certain phone number is marked as certain marking information exceeds the predetermined threshold, it passes the verification.

Again, for example, different credit rating of different users are assigned with different marking information weights, and the credit degree of the marking information is calculated according to such weights; when the credit degree of the marking information reaches a predetermined threshold, it passes the verification.

Again, for example, a database of the third-party system may be used to perform further verification.

A step S408: the cloud database and the local database are updated according to the verification result, and the phone number and its marking information are stored into the cloud database and the local database.

Preferably, when it is determined that the mobile terminal is connected to the network, the local database and the cloud database are synchronized and updated in real time. In a modified example, at a specified time interval, the local database and the cloud database are synchronized and updated. In another modified example, when the number of updated information reaches a certain threshold, the local database and the cloud database are synchronized and updated.

FIG. 8 shows a schematic diagram of the initial marking page in a specific embodiment of the present invention. Specifically, when the marking information of the phone number does not exist in the local database/the cloud database, the initial marking page popped out in the mobile terminal is shown in FIG. 8, wherein, the initial marking page shows the mostly common used phone number types set in the system by default, for example a sales call, a real estate agent, telephone harassment, fraudster, delivery service and the like, so that the user can immediately provide marking information of the phone number. Preferably, there are options used to share the marking information, to store the phone number into a backlist and to store the phone number into a contact list and so on.

When the marking information of the phone number is questioned, the marking correcting interface popped out in the mobile terminal is also shown in FIG. 8. Such marking correcting page gives out options that would be chosen to mark the phone number as "a sales call", "a real estate agent", "telephone harassment", "fraudster", "delivery service", "others (manual input) "; wherein, the options shown in the page are a plurality of to-be-verified marking information that is marked to phone numbers by different users. Additionally, the marking correcting page as shown in FIG. 9 may be displayed. For example, the marking correcting page shows a question of "138****** belongs to RUFENG express delivery?", and shows options of "NO", "YES" and "I don't know", in order to prompt the user to confirm the to-be-verified marking information of the phone number, such as "RUFENG express delivery". In another means, the marking correcting page as shown in FIG. 10 may be displayed. For example, the marking correcting page shows a question of "what type does 138****** belong to?", and shows options of "personnel headhunting", "other types" and "confirmation".

Above description specifically shows and describes some illustrative embodiments of the present invention. It is appreciated that, the present invention is limited to those disclosed embodiment. In fact, the present invention means to cover various modifications and equivalent configurations falling into the spirit and scope of accompanying claims.

The invention claimed is:

1. A method for marking a phone number, comprising:
   (a) obtaining, through a mobile terminal, a phone number of an incoming call to or of an outgoing call from the mobile terminal;
   (b) searching, by the mobile terminal, said phone number in at least one of a local database of the mobile terminal and a cloud database connected to the mobile terminal through a network, wherein said local database or said cloud database stores a plurality of phone numbers;
   (c1) when said phone number does not exist in the local database or the cloud database, displaying, through the mobile terminal, to a user a marking page for the user to input marking information for said phone number;
   (d) obtaining, through the marking device, the marking information for said phone number inputted by the user on the mobile terminal;
   (e) verifying, through a verifying device, the marking information; and
   (f) updating said cloud database or said local database according to the verified marking information,
   wherein step (e) further comprises:
   assigning a plurality of users a corresponding number of credit weights;
   when the plurality of users assign the same marking information to said phone number without a time limit or within a second reference time period, calculating a credit degree of said marking information according to credit weights assigned to the plurality of users; and
   verifying said marking information when said credit degree reaches a predetermined threshold.

2. The method for marking a phone number according to claim 1, further comprising:
   (c2) when said phone number exists in the local database or the cloud database, displaying the marking information corresponding to said phone number on the mobile terminal.

3. The method for marking a phone number according to claim 2, further comprising:
   receiving an instruction to correct the marking information;
   displaying a marking correcting page;
   receiving a new marking information inputted by the user;
   designating the new marking information as a to-be-verified marking information; and
   marking said phone number as a questioned number.

4. The method for marking a phone number according to claim 3,
further comprising:
prior to displaying the marking information corresponding to said phone number,
determining whether said phone number is said questioned number, wherein when said phone number is said questioned number, displaying the marking correcting page; when said phone number is not said questioned number, displaying the marking information corresponding to said phone number.

5. The method for marking a phone number according to claim 1, wherein in step (a),
searching the local database or the cloud database for said phone number is performed according to at least one of the following ways:
when said mobile terminal is not connected to the cloud database, searching the local database for said phone number;
when said mobile terminal is connected to the cloud database, detecting a network bandwidth of said mobile terminal, searching the local database for said phone number when the network bandwidth is lower than a first threshold, or searching the cloud database for said phone number when the network bandwidth is higher than the first threshold;
when said mobile terminal is connected to the cloud database, directly searching the cloud database for said phone number; or
when said mobile terminal is connected to the cloud database, searching the local database for said phone number, and when said phone number is not found in the local database, searching the cloud database for said phone number.

6. The method for marking a phone number according to claim 1,
wherein step (e) is performed:
when a time period since a last data transfer to a verifying device reaches a first time interval;
when said mobile terminal is connected to the network; or
when a network bandwidth of said mobile terminal is no smaller than a third threshold.

7. The method for marking a phone number according to claim 1,
wherein, in step (e), the marking information passes verification:
when said phone number receives the same marking information for a number of times that exceeds a fourth threshold; or
when, within a first reference time period, said phone number receives the same marking information for a number of times that exceeds a fifth threshold.

8. The method for marking a phone number according to claim 1, wherein step (f) further comprises:
updating said local database with the phone numbers in said cloud database that passed the marking verification process and their corresponding marking information; or
updating said cloud database with all the updated phone numbers in said local database and their corresponding marking information; or both.

9. The method for marking a phone number according to claim 1, wherein step (f) is performed when a number of said verified marking information that needs to be updated reaches an eighth threshold;
when a number of said verified marking information that needs to be updated since a last update reaches a ninth threshold;
when said mobile terminal is connected to the network; or
when the network bandwidth of said mobile terminal is no smaller than a tenth threshold.

10. A system for marking a phone number, comprising:
a plurality of mobile terminals, wherein each mobile terminal is used to receive an incoming phone call or making an outgoing phone call by a user, wherein the mobile terminal obtains a phone number of the incoming phone call or the outgoing phone call, wherein the mobile terminal is configured to display a marking page for said phone number and to obtain a marking information entered by the user, wherein the marking information corresponds to the phone number;
a plurality of local databases corresponding to said plurality of mobile terminals for storing the phone number and the marking information corresponding to the phone number;
one or more cloud databases for storing the phone number and the marking information corresponding to the phone number and synchronizing the local database with the corresponding marking information;
one or more marking devices for dynamically providing the marking page for the phone number according to a situation of whether or not the phone number obtained by the mobile terminal is matched in the cloud database or the local database, and delivering the obtained marking information to at least one of said local database and said cloud database; and
one or more verifying devices for verifying said marking information;
wherein said mobile terminal selects at least one of said local database and said cloud database to perform matching process on said phone number and said cloud database and said local database are synchronized according to a result of said marking verification process,
wherein said verifying device comprises a calculator for calculating credibility of the marking information or the phone number of recorded marking information according to marking weights of the user; and
a comparator for comparing credibility of or the phone number of the recorded marking information with a predetermined threshold, and
wherein said verifying device assigns different weights to marking information provided by different users and calculates credit degree of the marking information according to weights, when the credit degree of the marking information reaches a predetermined threshold, the verification device verifies the marking information as true.

11. The system for marking a phone number according to claim 10, wherein the marking device comprises a marking device local terminal associated with each mobile terminal and a cloud side marking device.

12. The system for marking a phone number according to claim 10, wherein:
when said phone number is successfully matched in said local database and/or said cloud database, said marking device further determines whether the phone number is said questioned number; and
when said phone number is said questioned number, said marking device provides the marking correcting page so as to prompt the user to select or confirm said to-be-verified marking information;

when said phone number is not said questioned number, said marking device provides the marking information corresponding to said phone number, and further determines whether said instruction for correcting a mark exists;

when said marking device receives said instruction for correcting a mark, said marking correcting page is provided so as to prompt the user to correct a previous verified marking information or said phone number, and a marking result fed back by the user is received so that the marking result is taken as the to-be-verified marking information of the number.

13. The system for marking a phone number according to claim 11, wherein the marking device local terminal is a sub-module of software installed locally for providing a marking page used to locally trigger a marking process and the side marking devices is a sub-module of the cloud server for providing a marking page used to trigger a marking process at the cloud side.

14. The system for marking a phone number according to claim 10, wherein said verifying device counts a number of times that a certain phone number is marked as a same marking information, when the number of times exceeds a predetermined threshold, the verifying device verifies the same marking information as true.

15. The system for marking a phone number according to claim 10, wherein said verifying device counts a number of times that the phone number is marked as a same marking information during a predetermined time period, when the number of times exceeds a predetermined threshold, the verification device verifies the marking information as true.

16. The system for marking a phone number according to claim 10, wherein said verifying device assigns a code to a device of a user, when the same user makes multiple times of correcting marking to a same phone number, only one marking correcting information is accepted.

17. The system for marking a phone number according to claim 10, wherein the marking device local terminal and the cloud side marking device communicates with the verifying device via internet.

18. A method for marking a phone number, comprising:
  (a) obtaining, through a mobile terminal, a phone number of an incoming call to or of an outgoing call from the mobile terminal;
  (b) searching, by the mobile terminal, said phone number in at least one of a local database of the mobile terminal and a cloud database connected to the mobile terminal through a network, wherein said local database or said cloud database stores a plurality of phone numbers;
  (c1) when said phone number does not exist in the local database or the cloud database, displaying, through the mobile terminal, to the user a marking page for the user to input marking information for said phone number;
  (d) obtaining, through the marking device, the marking information for said phone number inputted marked by the user on the mobile terminal;
  (e) verifying, through a verifying device, the marking information; and
  (f) updating said cloud database or said local database according to verified marking information, wherein step (e) further comprises:

assigning a priority level to the marking information of each phone number; and when a number of times that a same to-be-verified marking information associated with the phone number made by the user reaches a threshold number, marking the to-be-verified marking information pass verification.

\* \* \* \* \*